United States Patent
Jacob et al.

(10) Patent No.: US 9,470,423 B2
(45) Date of Patent: Oct. 18, 2016

(54) COOKTOP POWER CONTROL SYSTEM

(71) Applicant: Bose Corporation, Framingham, MA (US)

(72) Inventors: Kenneth D. Jacob, Framingham, MA (US); Adam C. Broders, Worcester, MA (US)

(73) Assignee: Bose Corporation, Framingham, MA (US)

( * ) Notice: Subject to any disclaimer, the term of this patent is extended or adjusted under 35 U.S.C. 154(b) by 305 days.

(21) Appl. No.: 14/094,301

(22) Filed: Dec. 2, 2013

(65) Prior Publication Data

US 2015/0153049 A1     Jun. 4, 2015

(51) Int. Cl.
*H05B 1/02*     (2006.01)
*H05B 6/06*     (2006.01)
(Continued)

(52) U.S. Cl.
CPC .............. *F24C 7/087* (2013.01); *F24C 7/083* (2013.01); *G05D 23/1902* (2013.01); *H05B 6/065* (2013.01); *F24C 3/126* (2013.01); *H05B 2213/07* (2013.01)

(58) Field of Classification Search
CPC ... H05B 6/065; H05B 2213/07; F24C 7/082; F24C 7/087; F24C 7/088
See application file for complete search history.

(56) References Cited

U.S. PATENT DOCUMENTS 2,263,420 A  *  11/1941  Hammell ...................... 219/485
2,816,998 A     12/1957  Fry et al.
(Continued)

FOREIGN PATENT DOCUMENTS

DE     29703787 U1    5/1997
EP      1347669 A2    9/2003
(Continued)

OTHER PUBLICATIONS

JP2008-147054A, Ohashi et al, Jun. 2008, Heating Device, partial translation.*
(Continued)

*Primary Examiner* — Joseph M Pelham
(74) *Attorney, Agent, or Firm* — Brian M. Dingman; Dingman IP Law, PC

(57) ABSTRACT

A cooktop power control system for a cooktop that has a plurality of burners, where the cooktop power control system controls the power delivered from two or more separate active burners to separate cookware items each of which is associated with an active burner. There is a maximum limit of total power that is available for delivery from all of the burners together. There is a heating control user interface associated with each of the burners, each heating control user interface constructed and arranged to be set by a user to a particular heating control user interface setting. A desired cookware temperature is derived from the setting of each heating control user interface. The measured temperatures of the cookware items are available to the cooktop power control system. The system has a controller that, when a plurality of burners are in sum calling for more than the maximum limit of total available power, automatically alters the power delivered from at least one of the active burners in comparison to the power called for by such burner, the alteration based on both the measured cookware temperatures of the cookware items that are associated with the active burners and the desired cookware temperatures derived from the heating control user interfaces that are associated with the active burners.

19 Claims, 7 Drawing Sheets

(51) Int. Cl.
*H05B 6/12* (2006.01)
*F24C 7/00* (2006.01)
*F24C 7/08* (2006.01)
*G05D 23/19* (2006.01)
*F24C 3/12* (2006.01)

(56) References Cited

U.S. PATENT DOCUMENTS

| | | |
|---|---|---|
| 2,819,371 A | 1/1958 | Aldrich et al. |
| 2,819,372 A | 1/1958 | Booker, Jr. et al. |
| 2,883,506 A | 4/1959 | Jordan |
| 2,883,507 A | 4/1959 | Lewis et al. |
| 2,892,917 A | 6/1959 | Staats |
| 3,005,080 A | 10/1961 | Bletz |
| 3,005,896 A | 10/1961 | Whinery |
| 3,049,606 A | 8/1962 | Weeks |
| 3,059,085 A | 10/1962 | Bletz |
| 3,072,773 A | 1/1963 | Clapp |
| 3,078,361 A | 2/1963 | Mason et al. |
| 3,118,044 A | 1/1964 | Holtkamp |
| 3,221,143 A | 11/1965 | Skala |
| 3,740,513 A | 6/1973 | Peters, Jr. et al. |
| 3,742,174 A | 6/1973 | Harnden, Jr. |
| 3,742,178 A | 6/1973 | Harnden, Jr. |
| 3,742,179 A | 6/1973 | Harnden, Jr. |
| 3,745,290 A | 7/1973 | Harnden, Jr. et al. |
| 3,777,094 A | 12/1973 | Peters, Jr. |
| 3,781,506 A | 12/1973 | Ketchum et al. |
| 3,786,220 A | 1/1974 | Harnden, Jr |
| 3,823,297 A | 7/1974 | Cunningham |
| 3,979,572 A | 9/1976 | Ito et al. |
| 4,381,438 A | 4/1983 | Goessler et al. |
| 4,431,892 A | 2/1984 | White |
| 4,481,409 A | 11/1984 | Smith |
| 4,490,596 A | 12/1984 | Hirai et al. |
| 4,493,980 A | 1/1985 | Payne et al. |
| 4,501,260 A | 2/1985 | Grace |
| 4,580,025 A | 4/1986 | Carlson et al. |
| 4,587,406 A | 5/1986 | Andre |
| 4,617,441 A | 10/1986 | Koide |
| 4,638,135 A | 1/1987 | Aoki |
| 4,740,664 A | 4/1988 | Payne et al. |
| 4,795,886 A | 1/1989 | Carter, Jr. |
| 4,816,647 A * | 3/1989 | Payne .................. 219/448.12 |
| 4,899,028 A | 2/1990 | Arai et al. |
| 5,508,495 A | 4/1996 | Yahav et al. |
| 5,611,327 A | 3/1997 | Teixeira Filho et al. |
| 5,893,996 A | 4/1999 | Gross |
| 5,947,370 A | 9/1999 | Rona et al. |
| 5,951,900 A | 9/1999 | Smrke |
| 5,981,916 A | 11/1999 | Griffiths et al. |
| 6,051,821 A | 4/2000 | Dahl et al. |
| 6,118,103 A | 9/2000 | Vilato et al. |
| 6,140,617 A | 10/2000 | Berkcan et al. |
| 6,206,564 B1 | 3/2001 | Adamczewski |
| 6,232,585 B1 | 5/2001 | Clothier et al. |
| 6,246,033 B1 | 6/2001 | Shah |
| 6,274,856 B1 | 8/2001 | Clothier et al. |
| 6,301,521 B1 | 10/2001 | Chen et al. |
| 6,320,169 B1 | 11/2001 | Clothier |
| 6,350,968 B1 | 2/2002 | Connolly et al. |
| 6,462,316 B1 | 10/2002 | Berkcan et al. |
| 6,630,650 B2 | 10/2003 | Bassill et al. |
| 6,737,617 B1 | 5/2004 | Daum et al. |
| 6,753,511 B2 | 6/2004 | Mathews, Jr. et al. |
| 6,904,378 B2 | 6/2005 | Schilling et al. |
| 6,953,919 B2 | 10/2005 | Clothier |
| 6,964,515 B2 | 11/2005 | Asakura et al. |
| 7,005,986 B2 | 2/2006 | Parks, III et al. |
| 7,049,564 B2 | 5/2006 | Takada et al. |
| 7,102,109 B2 | 9/2006 | Niiyama et al. |
| 7,157,675 B2 | 1/2007 | Imura |
| 7,473,387 B2 | 1/2009 | Temple et al. |
| 7,473,872 B2 | 1/2009 | Takimoto |
| 7,554,060 B2 | 6/2009 | England |
| 7,557,708 B1 | 7/2009 | Pachalok et al. |
| 7,692,121 B2 | 4/2010 | Pinilla et al. |
| 8,003,925 B2 | 8/2011 | Okada |
| 8,168,925 B2 | 5/2012 | Demol et al. |
| 8,212,192 B2 | 7/2012 | Tominaga et al. |
| 8,247,748 B2 | 8/2012 | Watanabe et al. |
| 8,269,148 B2 | 9/2012 | Marchand |
| 2004/0149736 A1 | 8/2004 | Clothier |
| 2005/0006379 A1 | 1/2005 | Sullivan |
| 2005/0193901 A1 | 9/2005 | Buehler |
| 2005/0242086 A1 | 11/2005 | Imura |
| 2007/0062930 A1 | 3/2007 | Swan et al. |
| 2007/0221668 A1 | 9/2007 | Baarman et al. |
| 2007/0257028 A1 | 11/2007 | Imura |
| 2008/0029505 A1 | 2/2008 | Rosenbloom et al. |
| 2008/0110875 A1 | 5/2008 | Fisher |
| 2009/0065496 A1 | 3/2009 | England et al. |
| 2009/0065497 A1 | 3/2009 | England et al. |
| 2009/0065498 A1 | 3/2009 | Beverly et al. |
| 2009/0065499 A1 | 3/2009 | England |
| 2009/0065500 A1 | 3/2009 | England |
| 2009/0152260 A1 | 6/2009 | Fujinami et al. |
| 2009/0173731 A1 | 7/2009 | Nagamitsu et al. |
| 2009/0294437 A1 | 12/2009 | Pinilla et al. |
| 2010/0051608 A1 | 3/2010 | Tominaga et al. |
| 2010/0065551 A1 | 3/2010 | Tominaga et al. |
| 2010/0102054 A1 | 4/2010 | Fujinami et al. |
| 2010/0119668 A1 | 5/2010 | Maupin et al. |
| 2010/0147832 A1 | 6/2010 | Barker, III |
| 2010/0187216 A1 | 7/2010 | Komada et al. |
| 2010/0206178 A1 | 8/2010 | Kataoka et al. |
| 2010/0219181 A1 | 9/2010 | Kusaka et al. |
| 2011/0000903 A1 | 1/2011 | Noguchi et al. |
| 2011/0000904 A1 | 1/2011 | Sakaibara et al. |
| 2011/0062143 A1 | 3/2011 | Satanek |
| 2011/0114627 A1 | 5/2011 | Burt |
| 2011/0198342 A1 | 8/2011 | Fujinami et al. |
| 2011/0284524 A1 | 11/2011 | Okuda et al. |
| 2011/0315674 A1 | 12/2011 | Fujinami et al. |
| 2011/0315675 A1 | 12/2011 | Sakakibara et al. |
| 2012/0000904 A1 | 1/2012 | Hashimoto et al. |
| 2012/0037614 A1 | 2/2012 | Komoto et al. |
| 2012/0061381 A1 | 3/2012 | Hashimoto et al. |
| 2012/0132642 A1 * | 5/2012 | Broders et al. ............... 219/488 |
| 2012/0132647 A1 * | 5/2012 | Beverly et al. ............... 219/624 |
| 2015/0282255 A1 * | 10/2015 | Christiansen et al. ........ 219/627 |

FOREIGN PATENT DOCUMENTS

| | | |
|---|---|---|
| EP | 1732357 A2 | 12/2006 |
| EP | 1625774 B1 | 9/2007 |
| EP | 1865754 A2 | 12/2007 |
| EP | 2094059 A2 | 8/2009 |
| EP | 2203029 A1 | 6/2010 |
| EP | 1625774 B2 | 8/2011 |
| EP | 2763499 A1 | 8/2014 |
| GB | 2308947 | 7/1997 |
| JP | 6151049 A | 5/1994 |
| JP | 9082466 A | 3/1997 |
| JP | 2008147054 A | 6/2008 |
| WO | WO94/01950 A1 | 1/1994 |
| WO | WO9941950 | 8/1999 |
| WO | WO2006050527 | 5/2006 |
| WO | WO2006126345 A1 | 11/2006 |
| WO | WO2007/082172 A2 | 7/2007 |
| WO | WO2007097821 | 8/2007 |
| WO | WO2009032979 | 3/2009 |
| WO | WO2009033036 | 3/2009 |
| WO | WO2009099445 | 8/2009 |
| WO | WO2010069825 A1 | 6/2010 |
| WO | 2012134769 A1 | 10/2012 |
| WO | 2013048061 A1 | 4/2013 |

OTHER PUBLICATIONS

International Search Report and Written Opinion of the International Searching Authority issued in corresponding PCT Application No. PCT/US2011/062557.

(56) References Cited

OTHER PUBLICATIONS

Elder, Jacqueline and Trota, Andrew M.; U.S. Consumer Product Safety Commission, Washington, DC; Memorandum to the Commission: Contractor Report on Evaluation of Sensor and Control Technologies to Address Cooking Fires on Glass Geramic Cooktops; Jul. 8, 2002, pp. 1-2; Arthur D. Little, Inc.; An Evaluation of Sensor and Control Technologies to Address Cooking Fires on Glass Ceramic Cooktops—Final Report to U.S. Consumer Product Safety Commission; Feb. 25, 2002; Order No. CPSC-S-01-1193; pp. i-7-1.

International Preliminary Report on Patentability from the International Bureau of WIPO issued in corresponding application No. PCT/US2011/062557 mailed on Jun. 13, 2013.

International Search Report and Written Opinion of the International Searching Authority mailed Jun. 26, 2012 in corresponding PCT Application No. PCT/US2012/028432.

Induction cooktops—How they work—Consumer NZ; 3 pages downloaded on Apr. 7, 2014. http://www.consumer.org.nz/reports/induction-cooktops/how-they-work.

Wikipedia, Induction Cooker, http://en.wikipedia.org/wiki/Induction.cooker, last accessed Oct. 29, 2010.

Patoux, Jerome "Cooking Inductively: ADI iCoupler Technology Isolates the Hob and the User Interface" Analog Dialogue 42-03, Mar. 2008; www.analog.com/analogdialogue, pp. 1-3.

Cooktop image, http://www.wired.com/gadgetlab/2008/01siemens-multi-t/; last accessed Aug. 23, 2011.

Wikipedia, Induction Cooker, http://en.wikipedia.org/wiki/Induction_cooker, last accessed Aug. 21, 2014.

International Preliminary Report on Patentability from the International Bureau of WIPO issued in corresponding application No. PCT/US2012/028432 mailed on Oct. 10, 2013.

The International Search Report and the Written Opinion of the International Searching Authority issued on Jul. 7, 2015 in corresponding PCT Application No. PCT/US2014/067014.

\* cited by examiner

COOKTOP POWER CONTROL SYSTEM

BACKGROUND

This disclosure relates to control of the power delivered to cookware by a cooktop.

Cooktops deliver power to cookware. For example, electrical cooktops (such as resistive and inductive-type cooktops) have a control system that delivers electrical power to the burners. When multiple active burners are in use at high power, the burners can in sum call for more power than is available to the system. In this case the amount of power delivered by the active burners must be less than the amount that is being called for. Delivering less power than needed can have a substantial impact on the cooking operations.

SUMMARY

In the present cooktop power control system, when the active burners in sum call for more power than is available the amount of power delivered by the active burners is controlled so as to minimize effects on cooking operations. This is accomplished by prioritizing the amount of power that is delivered to the active burners based on the temperatures of the cookware items and the temperature set-points of the active burners.

All examples and features mentioned below can be combined in any technically possible way.

In one aspect, a cooktop power control system for a cooktop that has a plurality of burners, where the cooktop power control system controls the power delivered from two or more separate active burners to separate cookware items each of which is associated with an active burner, wherein there is a maximum limit of total power that is available for delivery from all of the burners together, where there is a heating control user interface associated with each of the burners, each heating control user interface constructed and arranged to be set by a user to a particular heating control user interface setting, where a desired cookware temperature is derived from the setting of each heating control user interface, and where measured temperatures of the cookware items are available to the cooktop power control system, includes a controller that, when a plurality of burners are in sum calling for more than the maximum limit of total available power, automatically alters the power delivered from at least one of the active burners in comparison to the power called for by such burner, the alteration based on both the measured cookware temperatures of the cookware items that are associated with the active burners and the desired cookware temperatures derived from the heating control user interfaces that are associated with the active burners.

Embodiments may include one of the following features, or any combination thereof. The power delivered from a first active burner may be automatically decreased by a first amount and the power delivered from a second active burner may be automatically decreased by a different, second amount. The power delivered from a first active burner may be automatically decreased by a first amount and the power delivered from a second active burner may be automatically decreased by the same, first amount. The controller may automatically alter the power based at least in part on a rate of change of the measured cookware temperature of one or more of the cookware items. The controller may maintain at least a minimum amount of power delivered from each of the active burners. The minimum amount of power may vary depending on whether or not the measured temperature of the cookware associated with an active burner is in the boiling range.

Embodiments may include one of the following features, or any combination thereof. The desired cookware temperature may span a temperature range, and the controller may automatically alter the power further based on where the desired cookware temperature is in the temperature range. The temperature range may be divided into a plurality of portions, including, from coolest to hottest, a cool portion, a boiling portion, an intermediate portion and a hot portion. The controller may automatically alter the power based on which portion of the temperature range the desired cookware temperature is in, and a rate of change of the measured cookware temperature.

Embodiments may include one of the following features, or any combination thereof. The controller may prioritize the active burners into higher and lower priority active burners, and cause a greater percentage of the amount of power called for by a higher priority active burner to be delivered than the percentage of the amount of power called for by a lower priority active burner. The controller may prioritize an active burner as a higher priority burner if the measured temperature of the cookware associated with such burner is decreasing in comparison to the desired cookware temperature. The controller may prioritize an active burner as a lower priority burner if the heating control user interface for that burner has recently been turned on and the measured cookware temperature is low. The controller may prioritize an active burner as a higher priority burner when the desired cookware temperature of the cookware associated with such burner is higher than the desired cookware temperature of the cookware associated with another burner. The controller may prioritize an active burner as a lower priority burner when the difference between the desired cookware temperature and the measured cookware temperature of the cookware associated with such burner is relatively large and the measured cookware temperature is changing slowly. The controller may prioritize an active burner as a higher priority burner when the time at full burner power for the cookware associated with such burner to reach the desired cookware temperature is less than the time at full burner power for the cookware associated with another burner to reach the desired cookware temperature. When the prioritization of the active burner is selected as a higher priority burner may further be based on a threshold maximum time to reach the desired cookware temperature.

Embodiments may include one of the following features, or any combination thereof. The controller may prioritize an active burner as a lower priority burner when the measured cookware temperature of the cookware associated with such burner is greater than the desired cookware temperature. The controller may prioritize an active burner as a lower priority burner when the measured cookware temperature of the cookware associated with such burner is increasing rapidly. The controller may prioritize an active burner as a higher priority burner when the difference between the desired cookware temperature and the measured cookware temperature of the cookware associated with such burner is less than the difference between the desired cookware temperature and the measured cookware temperature of the cookware associated with another burner. When there are at least three active burners the controller may prioritize an active burner when the difference between the desired cookware temperature and the measured cookware temperature of the cookware associated with such burner is the least of those of all the active burners. When the measured temperature of the cookware associated with an active burner is in the boiling range, any automatic decrease in power delivered from the burner associated with that cookware may be accomplished relatively slowly.

In another aspect, a cooktop power control system for a cooktop that has a plurality of burners, where the cooktop power control system controls the power delivered from two or more separate active burners to separate cookware items each of which is associated with an active burner, wherein there is a maximum limit of total power that is available for delivery from all of the burners together, where there is a heating control user interface associated with each of the burners, each heating control user interface constructed and arranged to be set by a user to a particular heating control user interface setting, where a desired cookware temperature is derived from the setting of each heating control user interface, and where measured temperatures of the cookware items are available to the cooktop power control system, includes a controller that, when a plurality of burners are in sum calling for more than the maximum limit of total available power, automatically reduces the power delivered from at least one of the active burners in comparison to the power called for by such burner, the reduction based on both the measured cookware temperatures of the cookware items that are associated with the active burners and the desired cookware temperatures derived from the heating control user interfaces that are associated with the active burners. When an active burner is in the boiling range the controller reduces the power to such burner gradually.

In another aspect, a cooktop power control system for a cooktop that has a plurality of burners, where the cooktop power control system controls the power delivered from two or more separate active burners to separate cookware items each of which is associated with an active burner, wherein there is a maximum limit of total power that is available for delivery from all of the burners together, where there is a heating control user interface associated with each of the burners, each heating control user interface constructed and arranged to be set by a user to a particular heating control user interface setting, where a desired cookware temperature is derived from the setting of each heating control user interface, and where measured temperatures of the cookware items are available to the cooktop power control system, includes a controller that, when a plurality of burners are in sum calling for more than the maximum limit of total available power, automatically reduces the power delivered from at least one of the active burners in comparison to the power called for by such burner, the reduction based on: (i) the measured cookware temperatures of the cookware items that are associated with the active burners, (ii) the desired cookware temperatures derived from the heating control user interfaces that are associated with the active burners, and (iii) a rate of change of the measured cookware temperature of one or more of the cookware items. The reduction is such that the controller maintains at least a minimum amount of power delivered from each of the active burners that are requesting more than this minimum amount of power.

DETAILED DESCRIPTION

A high power cooktop with multiple burners at full power can require more power than the electrical outlet can deliver. When there is not enough available power to fully satisfy the present demand of all of the "active" burners (i.e., the burners that are in use), the available power must be shared in some way; in other words the power to at least one burner must be decreased relative to what that burner is calling for. In some cases the power to all of the active burners may be decreased. This decrease can be the same for all burners, or can be different for different burners. The differences can be based on one or more of the selection criteria described below. For example, the power delivered from a first active burner may be automatically decreased by a first amount and the power delivered from a second active burner may be automatically decreased by a different, second amount. However, power sharing should not always be used. If the sum of the power requested by all of the active burners is less than what is available then they don't need to share. Power sharing should occur only when the power available is less than the sum of the power requests from all active burners.

Figure 1:
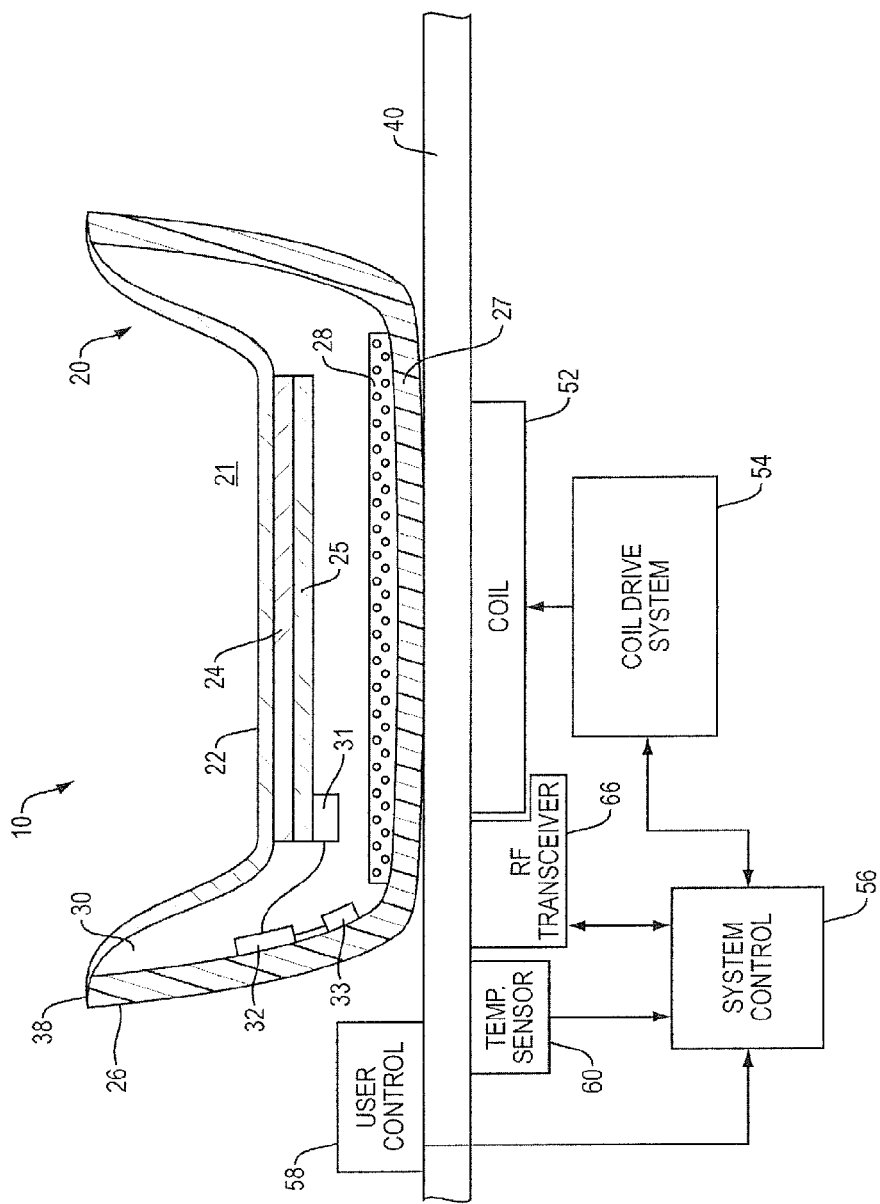
FIG. 1 is a schematic, partially cross-sectional diagram of a cooktop power control system for cookware that is heated by an induction heating system.

Cooktop power control system 10, FIG. 1, uses a single one-dimensional user control to automatically control both the temperature of inductively-heated cookware 20 as well as the power provided to cookware 20; power control allows control of the vigor at which the cookware contents boil, for example. Cookware 20 is located on cooktop 40. System 10 provides controlled amounts of power to cookware 20. Although the embodiment depicted in FIG. 1 uses electrical energy to provide the power that heats the cookware, and operates inductively, neither the source of power nor the manner in which the power is provided to the cookware are limitations of the disclosure. System 10 is able to control the provision of power to cookware regardless of the source of power (whether electrical or gas, for example) or the manner in which the power is provided to the cookware (electrically via induction or resistive heating, or by burning a cooking gas, for example).

Cookware 20 comprises inner wall 22 that heats food, water or other substances located in cookware 20 within cavity 21 formed by wall 22. Cookware 20 further comprises outer wall 26. Preferably outer wall 26 is made fully or partially from a material that is not heated by the time-varying electromagnetic field that emanates from induction coil or burner 52. This aspect allows the energy to be focused on inner wall 22 and also helps to accomplish cookware that remains relatively cool on the outside during use. However, this disclosure is not limited to use with such cool cookware and can be used with more traditional cookware in which the outer wall is hot. Outer wall 26 can be made from a plastic material such as bulk molding compound, melamine or liquid crystal polymer, for example. Inner wall 22 and outer wall 26 are preferably spaced from one another to define space 30 therebetween. Inner wall 22 and outer wall 26 may be sealed to one another along circumferential contact area 38. This accomplishes a sealed inner space or chamber 30 between walls 22 and 26. Chamber 30 can be used to house other aspects of cookware 20 and also can contribute to the desired thermal isolation of outer wall 26 from inner wall 22.

Target 25 is made from an electrically conductive material and preferably a ferromagnetic material such as 400 series stainless steel, iron or the like. Target 25 is the sole or primary material that is inductively heated via induction coil 52. Preferably, heat spreader 24 is directly coupled to both target 25 and inner wall 22. Heat spreader 24 is made of a highly heat conductive substance such as aluminum; the use of a heat spreader accomplishes more even heating of wall 22 than would be the case if target 25 was directly coupled to wall 22, although either arrangement is contemplated in this disclosure.

Thermal insulation 28 of a desired construction and configuration is typically located within chamber 30 and spaced from target 25. Insulation 28 helps to inhibit heat transfer from target 25 to outer wall 26. Insulation 28 may be located only on the bottom portion 27 of outer wall 26 as shown in the drawing or may extend partially or fully up along the inside of the upper portion of wall 26, and may fill some or essentially all of chamber 30. In one non-limiting embodiment, insulation 28 is a layer comprising an aerogel that is bounded on both faces by a reflective film such as a metalized plastic film in which the metal is etched in a manner to inhibit inductive heating of the metallization. This insulation is highly effective at inhibiting heat transfer between target 25 and the portion of outer wall 26 that is covered by insulation 28. Heat transfer can be further inhibited by other constructional aspects such as creating a vacuum within space 30 or filling space 30 with a material that is a poor heat conductor, for example a gas such as argon gas. More generally, cool cookware includes thermal insulation and/or a vacuum between the inner cooking surface and the external cookware wall, to inhibit heat transfer from the cooking surface to the external wall. Aspects of the disclosure relate to any type or design of such cool cookware.

Aspects of cookware 20 are further disclosed in commonly-assigned U.S. patent application Ser. No. 12/205,447, filed on Sep. 5, 2008, the disclosure of which is incorporated herein by reference. However, the disclosure herein is not limited to any particular type of cookware. For example the temperature and power control system can be used with more traditional cookware in which the external wall is directly heated and thus at about the same temperature as the food being cooked.

System 10 comprises induction coil (i.e., burner) 52 located just underneath or potentially embedded within cooktop 40. Cooktop 40 is preferably made from a ceramic glass material as is well known in the art, but that is not a limitation; when the cookware is cool the cooktop may be made of other materials that are not as heat resistant, including materials that have not traditionally been used for cooktops such as solid surface countertop materials, wood, tile, laminate countertop materials, vinyl, glass other than ceramic glass, plastic, etc.

Coil drive system 54 provides power to coil 52 under control of induction cooking system control (e.g., controller) 56. Controller 56 is preferably a microprocessor that executes software that performs mathematical or logical operations. The use of a controller to control operation of a coil drive for an induction coil in an induction cooking system is known in the art. Aspects of system 10 are further disclosed in commonly-assigned U.S. patent application Ser. No. 12/335,787, filed on Dec. 16, 2008, the disclosure of which is incorporated herein by reference.

Cookware temperature sensing is accomplished at one or more locations of the cookware. Temperature sensing can be accomplished with direct contact temperature sensors such as thermocouples or thermistors, for example. Temperature sensing can also be accomplished with non-contact indirect sensors such as optically-based temperature sensors (e.g., infrared sensors). In the non-limiting embodiment depicted in FIG. 1, direct contact temperature sensor 31 is coupled to target 25 either directly, or indirectly via a temperature conductive substance such as heat conductive epoxy. Temperature sensor 31 determines the temperature of target 25 at the location of temperature sensor 31. Alternatively, temperature sensor 31 could be located on the side of inner wall 22 facing chamber 30, or could be located elsewhere in chamber 30 at a location where the temperature sensor was exposed to one or more heated portions of the cookware. A non-contact sensor such as an optical sensor could be located spaced from target 25 and/or inner wall 22, for example in chamber 30 or in or on the inside of outer wall 26; location in or on outer wall 26 may simplify communication of the sensed temperature data outside of cookware 20 as explained below.

Cookware 20 further comprises wireless transmitting device 32 that is operatively connected to the one or more temperature sensors 31 to receive sensed temperature data therefrom. This is one means of transferring data representative of a cookware temperature from the cookware to an external device that is part of system 10, to allow the data to be further employed. In one implementation, device 32 may be an RF enabled microcontroller that communicates via RF with RF transceiver 66. Power can be provided to device 32 using coil 33 that is operatively connected to wireless transmitter 32. Coil 33 is inductively coupled to and derives power from the electromagnetic field that is output by induction coil 52. When such an energy pick-up coil 33 is used, it may be physically located closer to induction coil 52 than shown in the drawing, for example, embedded within or just below or on top of the lower portion 27 of cookware outer wall 26. Physical proximity accomplishes better coupling.

The temperature may alternatively or additionally be sensed remotely from the cookware, particularly in cases in which the outer surface of the cookware is hot. For example, temperature may be sensed in a structure that is in thermal contact with the cookware. One example is the cooktop. This could be accomplished with temperature sensor 60 located just below or embedded within or even on the top surface of cooktop 40 underneath the location at which cookware 20 will be located during use of the induction coil. The output of temperature sensor 60 is provided to system control 56. The disclosure is not limited to any particular means of sensing cookware temperature. As an additional example, temperature can be detected remotely from the cookware, e.g., via an infrared sensor located in the vicinity of the cooktop such as mounted to a fume hood. Further, the system can use an absolute cookware temperature as described above, or could use a relative cookware temperature that is offset from the actual temperature as long as the offset from actual temperature was known, at least approximately.

For a cooktop with multiple burners, typically each item of FIG. 1 would be repeated for each burner, except that there could be a single system controller 56 that was responsive to the user controls and measured cookware temperatures of all of the burners. Controller 56 would control active burner power by issuing appropriate commands to each of the coil drive systems 54.

Figure 2A:
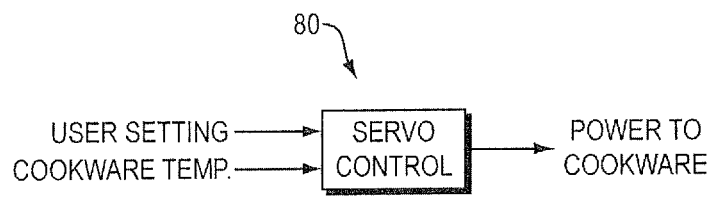
FIGS. 2A and 2B are functional block diagrams of a control arrangement employed in the system of FIG. 1.
Figure 2B:
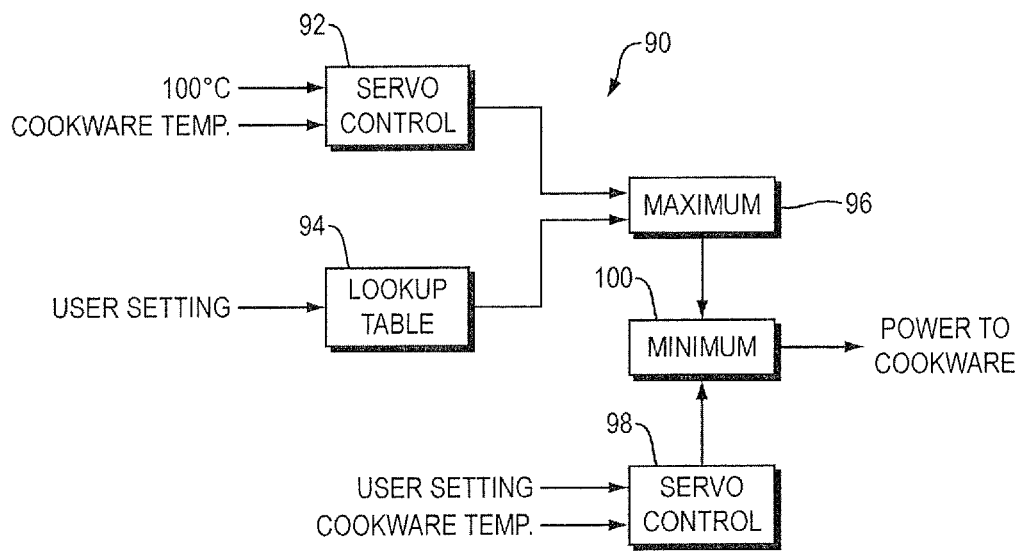

FIGS. 2A and 2B are functional block diagrams of one example of a control arrangement that can be employed in the cooktop power control system of FIG. 1. Cooktops have a cookware heating control user interface, which is typically a one-dimensional manually manipulated device such as a knob that is turned, or a physical or virtual (e.g., capacitively-operated) slider or similar manually operated control. User-operated heating control user interface (UI) 58 is shown in FIG. 1. Heating control user interface 58 can have a temperature set point indicator or a power set point indicator or can be an arbitrary scale. In the non-limiting example herein heating control user interface 58 has an arbitrary scale of 0-100. The heating control user interface set point is interpreted (either by user control 58 itself or by system control 56) to derive one or more control outputs that are provided to coil drive system 54 so as to accomplish control of the amount of power delivered to cookware 20. The interpretation of the heating control user interface can be a desired absolute cookware temperature, or a relative cookware temperature.

Heating control user interface 58 is used to control both the cookware temperature and the maximum limit of power that is delivered to the cookware—at least in certain circumstances and within a predetermined (first) portion of the user interface operating range. In an embodiment this portion of the operating range is around the boiling point, where cookware temperature is not a reliable indicator of the vigor of the boil and thus power control is needed in order to allow control of boiling vigor. In this embodiment, at user interface set point temperatures that are below and above this first portion of the operating range, the system servos the power delivered to the cookware so as to hold the cookware temperature constant at the desired cookware temperature set point.

The embodiment of the control arrangement shown in FIGS. 2A and 2B works as follows. The inputs are the heating control user interface setting and the measured cookware temperature. The heating control user interface setting is preferably interpreted (e.g., using a lookup table, not shown) as a desired absolute cookware temperature set point; this temperature set point is then provided as one of the two variable inputs to the control arrangement. For heating control user interface temperature settings that are below or above a predefined (first) temperature range (e.g., above or below the range around boiling described above, which in one non-limiting example is from about 95° C. to about 150° C.), temperature servo control 80 is used by system control 56 to control the power delivered by coil drive system 54 to coil 52, and thus to control the power delivered to the cookware. The inputs to servo control 80 are the heating control user interface setting (specifically, the desired cookware temperature set point that is derived from the setting of heating control user interface 58), and the measured cookware temperature. The output of servo control 80 is a control signal that is used to control the power delivered to the cookware. Temperature servo control 80 thus governs the power setting so as to quickly bring the temperature up to the desired set point, and then hold the sensed cookware temperature constant at the desired set point.

There are many possible control laws that could be used to accomplish the temperature servo controls in the control arrangements shown in FIGS. 2A and 2B, as is known in the field. In an embodiment, servo control 80 is accomplished with a PID controller. A PI controller or other controllers known in the field that could accomplish the stated results could be used instead. Typically, the control law results in full power being provided to the cookware until the temperature is close to the desired set point, so that the food is quickly heated to the temperature set point. Temperature-based PID controllers for cookware are known in the art and so will not be further described herein. The gains used in the PID controllers depend on the particular hardware used in the cooktop and the cookware. For servo control 80 and the other two temperature-based control loops in the control arrangement shown in FIGS. 2A and 2B (servo controls 92 and 98), other types of controllers that are able to maintain a measured cookware temperature based on a temperature set point can be used. As one non-limiting example, PI controllers with zeros at 0.01 Hz can be used for the three temperature servo controls.

For heating control user interface settings that are within the predefined temperature range around boiling, control arrangement 90, FIG. 2B, is employed by system control 56. Arrangement 90 includes two temperature servo controls 92 and 98, both of which may be PI or PID temperature controllers, each of which is similar to servo control 80. The inputs to servo control 92 are the boiling temperature (nominally 100° C.) and the measured cookware temperature. Servo control 92 thus is able to keep the cookware temperature at 100° C. The inputs to servo control 98 are the heating control user interface setting (specifically, the desired cookware temperature set point that is derived from the setting of the heating control user interface) and the measured cookware temperature. Servo control 98 thus is able to keep the cookware temperature at the desired user set point. The third control aspect of arrangement 90 is power lookup table 94. The heating control user interface setting (specifically, the desired cookware temperature set point that is derived from the setting of the heating control user interface) is used to select the value for maximum available output power limit from LUT 94. Typically the output of LUT 94 is a power setting that monotonically rises with the user interface setting. An alternative to a LUT could be a function enabled by system control 56 that calculated a power based on the setting of heating control user interface 58. Also, the functions of both LUT 94 and the LUT (not shown) that is used to derive a desired temperature set point from the setting of the heating control user interface could be accomplished with a single lookup table, or in other manners that would be apparent to those skilled in the field such as via calculations based on the user setting.

The power that is actually provided to the cookware is then determined by selection of the minimum (block 100) of two values: the first value is the maximum (block 96) of the outputs of servo control 92 and LUT 94, and the second value is the output of servo control 98.

In an ideal sense the control scheme accomplished with servo control 80 could be accomplished by control arrangement 90, which would make servo control 80 superfluous. In this case, a beginning integral value for the PID controllers may need to be calculated when control passes from LUT 94 to a PID controller (or to any other PID-style controller that is like a PID controller in that it needs an input integral value), as there would be no previous integral value for use as an input to the PID loop. This calculation would be apparent to those skilled in the field. Once the initial condition of a PID-style controller (the last integral value) is provided, it creates its own input integral value from its output, so this calculation would only need to be done when control was first passed to the PID-style controller.

Figure 3:
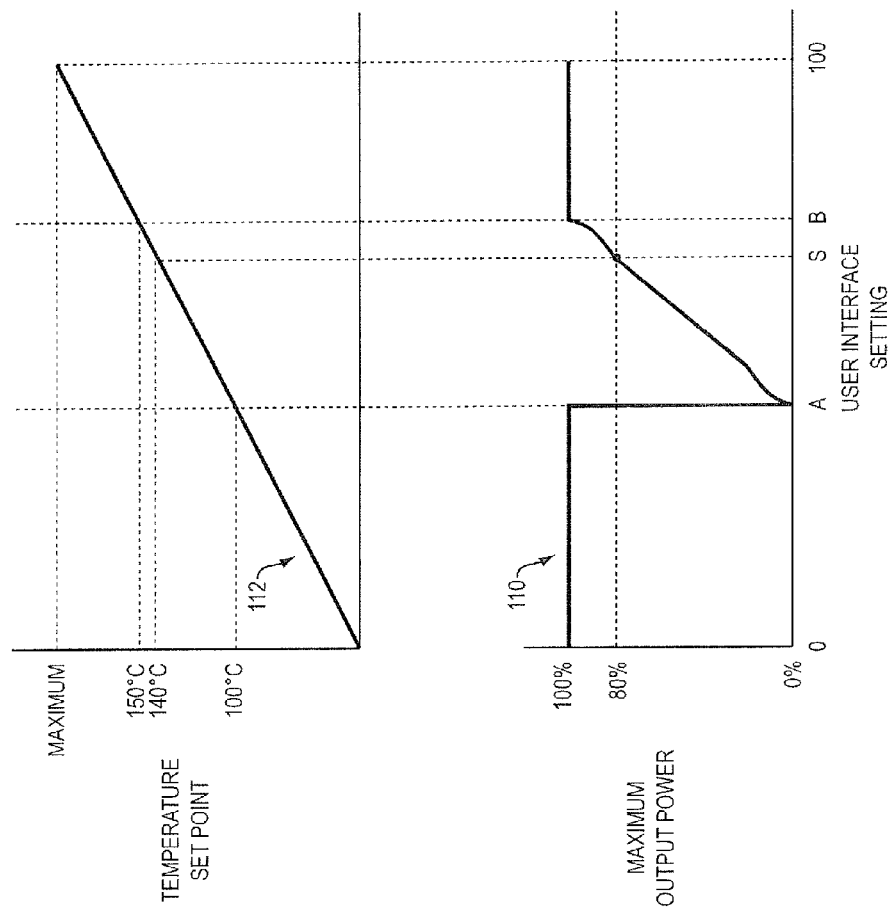
FIG. 3 depicts a translation of the cooking system user control or heating control user interface setting into two outputs—set point desired cookware temperature and maximum output power limit.

An example of the heating control user interface settings, the corresponding output power provided to the cookware, and the desired cookware temperature set point that is derived from the heating control user interface setting, is shown in FIG. 3. For heating control user interface settings between the lowest value (0) and the value labeled "A", and from the value labeled "B" up to the maximum value of 100, the output power limit (shown as graph line 110) is 100%. For settings between A and B the maximum output power limit increases monotonically over the A-B range from about 0% to 100% of the power that can be delivered to the cookware by the power control system. In one example, value A corresponds to the boiling point (nominally 100° C.) and value B corresponds to about 150° C. Graph line 112 shows the set point desired cookware temperatures (i.e., the "user setting" input to the control arrangement shown in FIGS. 2A and 2B) that correspond to the heating control user interface settings for the example illustrated in FIG. 3.

In the A to B temperature range the control law enabled by system control 56 controls the power provided to the cookware within a cookware temperature range bounded on the low end by point A and on the upper end by the temperature that corresponds to the heating control user interface setting (which is greater than A and less than B, labeled "S" in FIG. 3). The variable power level in the A-B range accomplishes better control over the vigor of boiling than does control based on a temperature-based control law as is used from 0 to A and from B to 100. The A to B temperature range includes the measured temperature at which boil begins and occurs, and extends for a desired temperature range above the boiling point to point B. The range selected would be specific to the hardware. For example, in cases in which the cookware temperature is measured (as opposed to, say, cases in which the food temperature is measured), the measured temperature may not correspond to the food temperature. In the example illustrated in FIG. 1, the measured temperature is the temperature of the target, which is typically hotter than the food. A target temperature of 110° C. may correspond to a food temperature of around boiling, which can be used as point A. Boiling point variations dependent on elevation should also be taken into account. Typically, point A will be selected to be just below boiling (e.g., potentially in the range of from about 90° C. to about 110° C.); a higher value will cause sudden boiling and a lower value will cause slower heating times, especially for low power settings. Typically, point B is selected to achieve a cookware content temperature of around 150° C.; a higher value limits the cooking capabilities of the system because it slows heat-up time for any temperatures between A and B, while a lower value reduces the power resolution in the A-B range and thus results in poorer control of boil vigor. Point B is the maximum target temperature at which power is directly controlled by the user, and thus is the end point for direct control over boiling vigor. Depending on the construction of the cookware and where on the cookware the measured temperature value is taken, point B could potentially range down to closer to boiling (e.g., around 100° C. to around 120° C.) up to around 150° C. or perhaps higher. In a case in which the target temperature of induction cookware is the measured temperature value, point B will likely fall in the range of from about 120° C. to about 170° C.

The power control arrangement employed in this A to B range provides resolution which allows control over the vigor of boiling; this control can be accomplished over a desired range of boiling characteristics. For example, the range can be enabled from simmer (which actually begins a few degrees below the boiling point) through a vigorous rolling boil. The width or scale of the A to B temperature range should be large enough to allow for a desired power control granularity; a wider range is thus at least theoretically better. However, a functional tradeoff associated with the dual set point control arrangement over the selected A to B temperature range is the time period over which the food comes up to temperature when the desired temperature is in the A to B range and the food does not go through a phase change. As the control scheme provides less than full power over the A to B temperature range, heating of the food is slowed as compared to a standard temperature servo. This tradeoff thus suggests a relatively narrow A to B range. In practice the upper end of the range can be about 150° C. because not many foods are cooked in the range from above boiling up to about 150° C., so the practical risk associated with the longer heat-up time is minimal.

The slope of the power curve in the A-B range is selected to achieve a desired result. The slope can be greater around the end points because lower powers typically are not sufficient to maintain boil so fine control is not useful close to A, and small changes in high power close to B have little effect on the apparent vigor of the rolling boil around point B. Increasing slope around A and B allows a flatter curve across most of the midrange, providing the user with finer control over the power provided to the cookware and thus better control over the vigor of the boil. Other mappings of heating control user interface settings to power in the A-B range are contemplated herein. Typically, though, the function monotonically increases over the range so that the power never decreases as the control is turned up, as would be expected in cooktop operation.

The disclosure contemplates mapping the position of the heating control user interface to both a temperature set point and an output power, over at least a portion of the system operating range. This mapping could be accomplished in other manners that would be apparent to those skilled in the field. For example, the values could be calculated by controller 56 using predetermined algorithms that were appropriate for the selected hardware.

The disclosure herein contemplates the use of one, or perhaps more than one, cookware temperature range over which power delivered to the cookware is controlled per se, rather than control to a temperature set point. Most commonly, but not necessarily, the boiling range will be included, as it is here where fine control over the energy is useful to provide better control over boiling vigor. The available output power function over relevant temperature range(s) need not be as depicted in FIG. 3. Rather, any function that achieves a desired power control over the selected temperature range(s) can be used, and enabled by system control 56.

Figure 4:
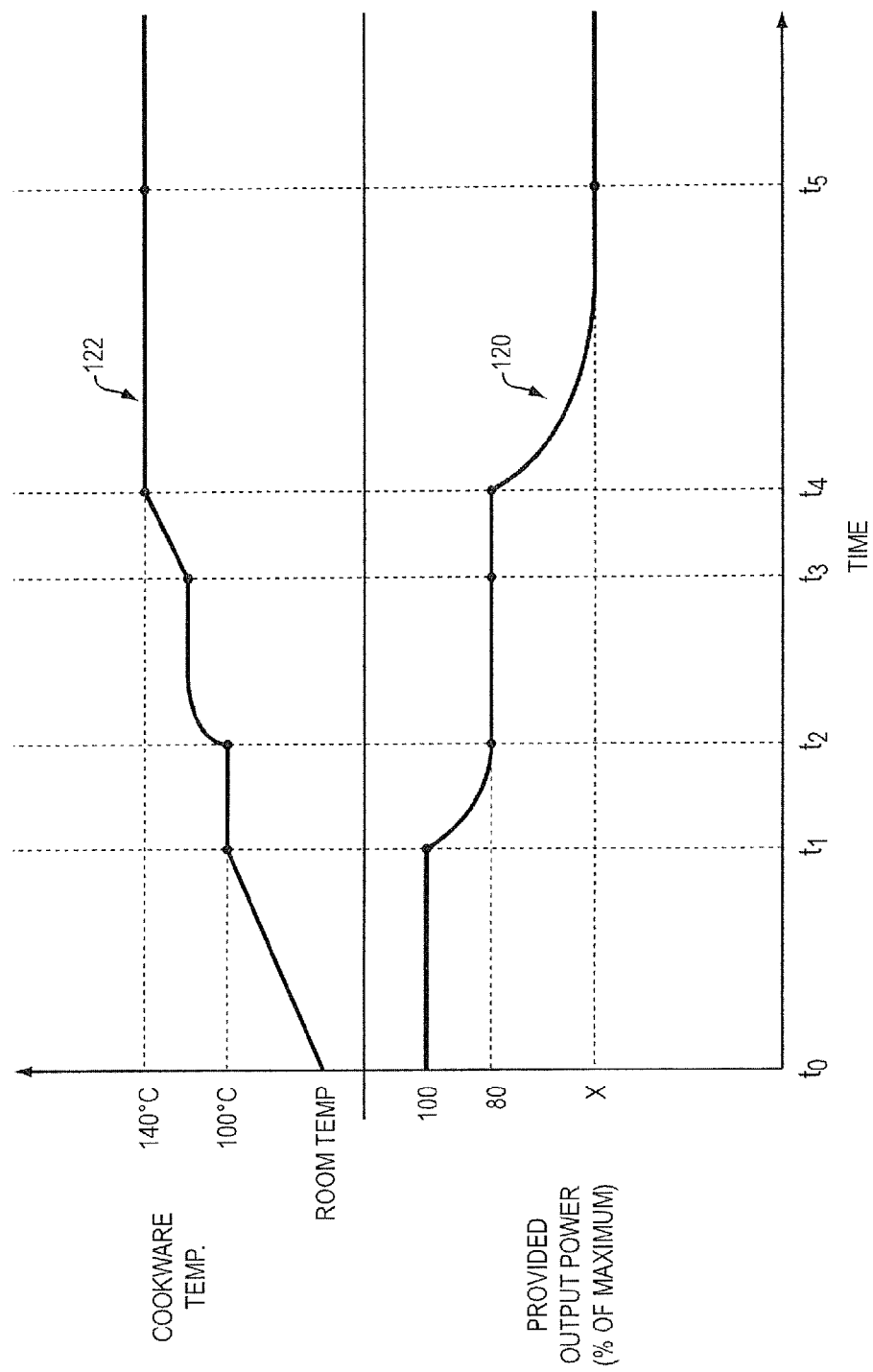
FIG. 4 illustrates the output power and cookware temperature over time for an example that illustrates the cooktop power control.

FIG. 4 shows the provided output power (graph line 120) and cookware temperature (graph line 122) over time t0 (when the heating control user interface is set by the user) to t5 (when long term steady state temperature has been reached) for an example that illustrates an embodiment of the cooking temperature control. In the example, the heating control user interface is set to a value ("S", FIG. 3) which corresponds to 140° C. and a limit of 80% of maximum available output power. This setting (above 100° C. and below 150° C.) puts the control in the realm of arrangement

90, FIG. 2B. Boiling is indicated as 100° C., but could actually be higher than that: since the target is hotter than the food being cooked, when the target temperature is measured as opposed to the temperature of the contents of the cookware, the measured temperature at boiling will actually be above 100° C.

From time t0 to t1 (when the measured temperature reaches the temperature of boiling), the output (coil 52) power remains at 100% while the cookware temperature increases to boiling (nominally 100° C.)—this 100% output power is the servo control 92 output. During this time period the output of servo control 98 is also at 100%, so that as a practical matter either servo control 92 or servo control 98 could be in control. In a non-ideal sense as the cookware temperature approaches 100° C. servo control 92 will request less than 100% power while servo control 98 requests 100% power, giving control (because of minimum selection function 100) to servo control 92.

From t1 to t2 the power falls off to 80% while the cookware remains at boiling temperature. In this time period servo control 92 remains in control, as its output is greater than the 80% output of lookup table 94 (and thus is selected by maximum selection function 96), while the output of servo control 98 remains at 100% (and thus is deselected by minimum selection function 100). Power decays gradually because the temperature of the contents of the cookware lags that of the target, and as that temperature difference decreases the power required to maintain the target temperature at boiling (nominally 100° C.) decreases.

From t2 to t3 lookup table 94 is in control since its output (80%) is greater than the output of servo control 92 and less than the output of servo control 98. The output power thus remains at 80%, which causes the cookware to heat up until it reaches a new intermediate steady state value. One reason for the increase in temperature is that in the example for the cookware to remain at 100° C. requires less than 80% power. At 80% power, the target temperature will increase above 100° C., the boil vigor will increase and more steam will be created (the energy that does not maintain the boil goes into the creation of steam), and the target will eventually settle at a higher temperature. The rise in measured cookware temperature is similar to the reason the power dropped off between t1 and t2, except this time power is kept the same (at 80%), and temperature is allowed to rise.

From t3 to t4, because the temperature is less than the set point, servo control 98 remains at 100%. Thus, lookup table 94 is in control and the power remains at 80%. The cookware contents are dry enough (e.g., most of the water in a vegetable such as onion or mushrooms has "sweated" from the vegetable) such that the temperature begins to increase above where it was during boiling, to the 140° C. user interface desired cookware temperature set point.

From t4 to t5 the temperature is at the desired cookware temperature set point, so servo control 98 causes the power to drop off to some level below 80% at which the cookware temperature is maintained at the 140° C. set point. The steady state output power value ("X") is indeterminate as it depends on the hardware construction, and the cookware contents. The gradual power decay from t4 to t5 is the effect of two aspects. One is that servo control 98 has taken over. The other is that, like when the system approached 100° C. and servo control 92 slowly reduced power because of the objects around the cookware, now servo control 98 is doing the same thing. The difference this time is that lookup table 94 is not in control because its 80% output power is greater than X, and so lookup table 94 does not stop the drop in power.

A high power cooktop with multiple burners at full power can require more power than the electrical supply can deliver. To deal with this, typical cooktops will reduce the amount of power being delivered to each burner until the total cooktop uses no more than what the electrical outlet can safely supply. The cooktop power control system herein can deal with such undersupply of power via one or more control algorithms accomplished in system controller 56, FIG. 1, that are effective to control the power delivered by the burners (i.e., share power among the burners) so as to have less effect on cooking operations than would otherwise be the case if all burners were equally reduced. As the system has available to it both the user set-point temperature and the actual cookware temperature for all of the active burners in use, the system is able to estimate the user's intent (e.g., vigorous boil, "sweating" vegetables, or searing a steak) and also knows the current and past state (e.g., temperature over time) of the cookware. This allows for a more intelligent power sharing algorithm that can provide a better user experience.

The below describes a simple two burner example, however most or all of the below would equally apply to a cooktop with three or more burners. Also, in the subject cooktop power control system the conditions described below are discretionary rather than mandatory.

When there is not enough power to fully satisfy the current demand of all of the "active" burners (i.e., the burners that are in use), the available power must be shared in some way; in other words the power to at least one burner must be decreased relative to what that burner is calling for. In some cases the power to all of the active burners may be decreased, but not necessarily by the same amount, or by the same percentage of the power that the burner is calling for. Power sharing should not always be used: if the sum of the power requested by all of the active burners is less than what is available then they don't need to share. Power sharing should occur when the power available is less than the sum of the power requests from all active burners. In system 10, FIG. 1, power sharing is accomplished by controller 56 issuing appropriate commands to the coil drive systems 54 of each active burner 52.

Figure 5:
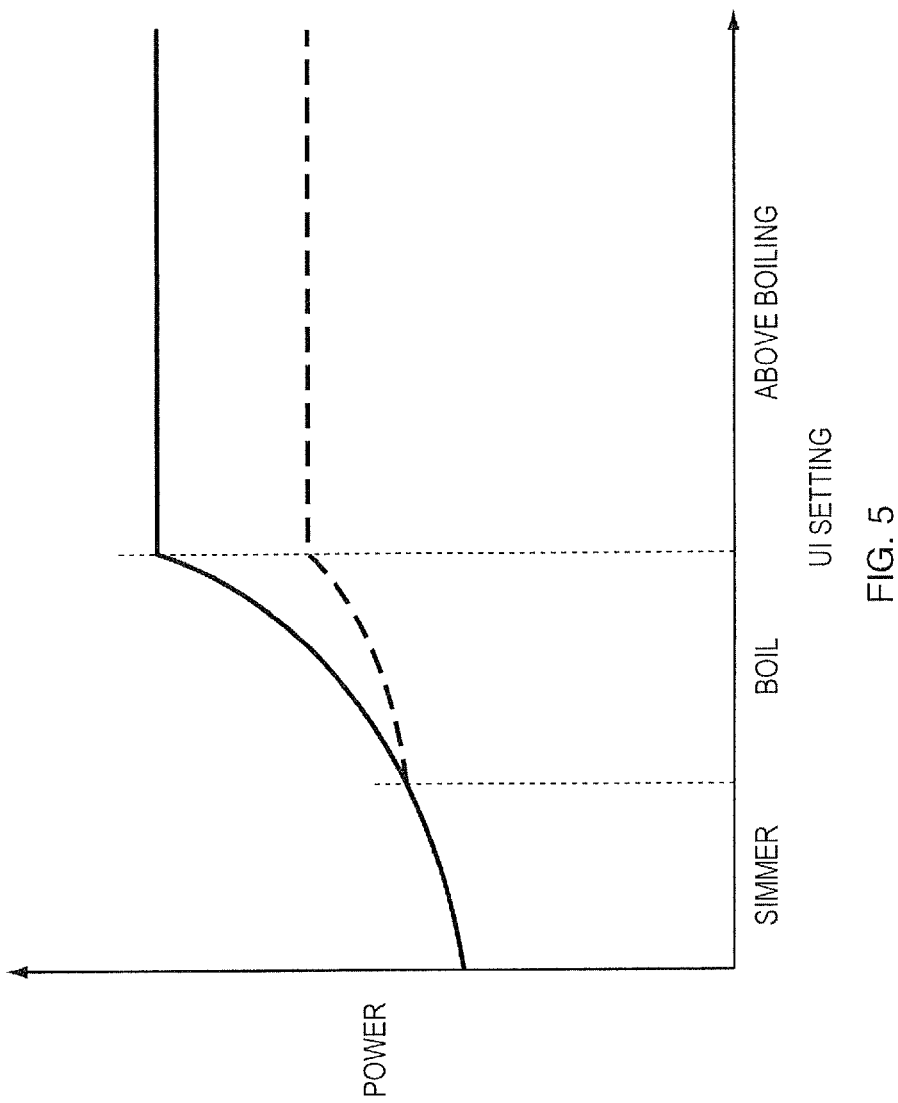
FIG. 5 illustrates the maintenance of at least a minimum power to each burner during a power sharing operation.

There are a few conditions where special circumstances in power sharing should yield preferable behaviors. As one example, when contents are being boiled, cookware which changes its boiling vigor often and suddenly is not desirable. Boiling also requires a significant amount of power to maintain and can change appearance quickly with small changes in power. For these reasons there are two rules that should be applied by the power sharing algorithms during a boiling operation. First, power sharing should be removed from and given back to boiling cookware gradually or slowly, to avoid sudden appearance changes. For example, the change in power can follow a generally (but not literally) asymptotic curve, as opposed to being a step function. As another example, the change in power in the boiling range can be limited to a maximum amount of power per time period, say no more than 25 watts per second. The decrease per second could be varied based on the actual power output, as at some powers the changes would be less visible than at other power outputs. Second, a minimum power output for a given UI setting should be applied; one example is shown in FIG. 5, where the lower graph line indicates minimum power during power sharing and the upper graph line indicates the requested power from the control system. Another aspect illustrated in FIG. 5 is that during a simmer operation it is best not to automatically reduce the power as small changes in power have a very noticeable effect, while during a boil the power can be reduced to some extent.

Another condition which should always be satisfied is to provide a minimum amount of power to each active burner that is requesting more than this minimum amount of power (as opposed to reducing the power to zero). If a particular burner is not provided any power (or a very small amount or negligible amount of power), the user is likely to be disappointed with performance. One non-limiting example would be to set a minimum power of 1 KW for any burner that is requesting more than 1 KW.

Another condition which should always be satisfied occurs when the cookware is heating up to its setpoint temperature. If cookware has just been turned on and its temperature is rather cold (e.g., near ambient, or perhaps below boiling) then the user has likely not started cooking in it and a slower than normal heat up time is likely acceptable as compared to sacrificing an ongoing cooking process on another burner. This adds another condition or rule that if a burner has recently been turned on (and potentially as well when the cookware is relatively cold (e.g., it has not reached its setpoint temperature, or it is at least a predetermined amount below its setpoint temperature)), that burner should be de-prioritized as compared to a burner where the cookware is already heated and likely cooking something. A higher priority burner will have its provided power reduced relative to its requested power less than a lower priority burner will have its power reduced. This may be less in absolute terms, or in percentage terms, or both. Note that under all circumstances it is preferable to maintain a positive temperature increase (positive dT/dt, where "T" is temperature and "t" is time) on any cookware that is at less than its set-point temperature (i.e., it is being heated).

After application of the conditions set forth above there are more general conditions that can be applied as desired. Note that the conditions are discretionary rather than mandatory. Some of the general conditions may be as follows. If a first UI is set to greater than 150 C and a second is set to less than 150 C, it is better to prioritize the first burner and thus take more power from the second burner. This is because higher temperature cooking operations tend to be more critical to their temperature differential (i.e., the difference between the setpoint and the actual measured temperature) than do operations at less than 150 C, which are typically boil operations or warming operations, for example. More generally, the burner with the higher setpoint temperature may be prioritized over one with a lower setpoint temperature.

Another general condition can be that if a first cookware item has a relatively large temperature differential between the UI setpoint temperature and the measured cookware temperature (e.g., greater than a certain percentage of its setpoint temperature, or perhaps greater than a fixed differential such as 10° C.), and the rate of change of the temperature is small (e.g., is less than it would be for a dry pan being heated at full power), and the rate of change is variable or "noisy" all of which are indicative of a "sweating" operation, this burner should be de-prioritized. One reason is that when foods are being sweated, they will remain in the sweating zone for some time and so typically it will take some time until the setpoint temperature is reached, so a short additional delay due to automatic reduction of power will likely not make a substantial difference to the cook.

Yet another general condition is that if an estimate of the time to reach the target temperature (which can be determined, for example, based on the temperature differential and the rate of change of the measured temperature) is smaller in a first cookware item as opposed to a second, and the estimated time to reach the setpoint is sufficiently short for the first cookware (as established by comparison to a predetermined maximum time limit to reach setpoint temperature), de-prioritize the second cookware. This allows one item to reach operating temperature when it is already close to it and should reach it quickly. The estimate can take into account the control algorithms described above.

Figure 6:
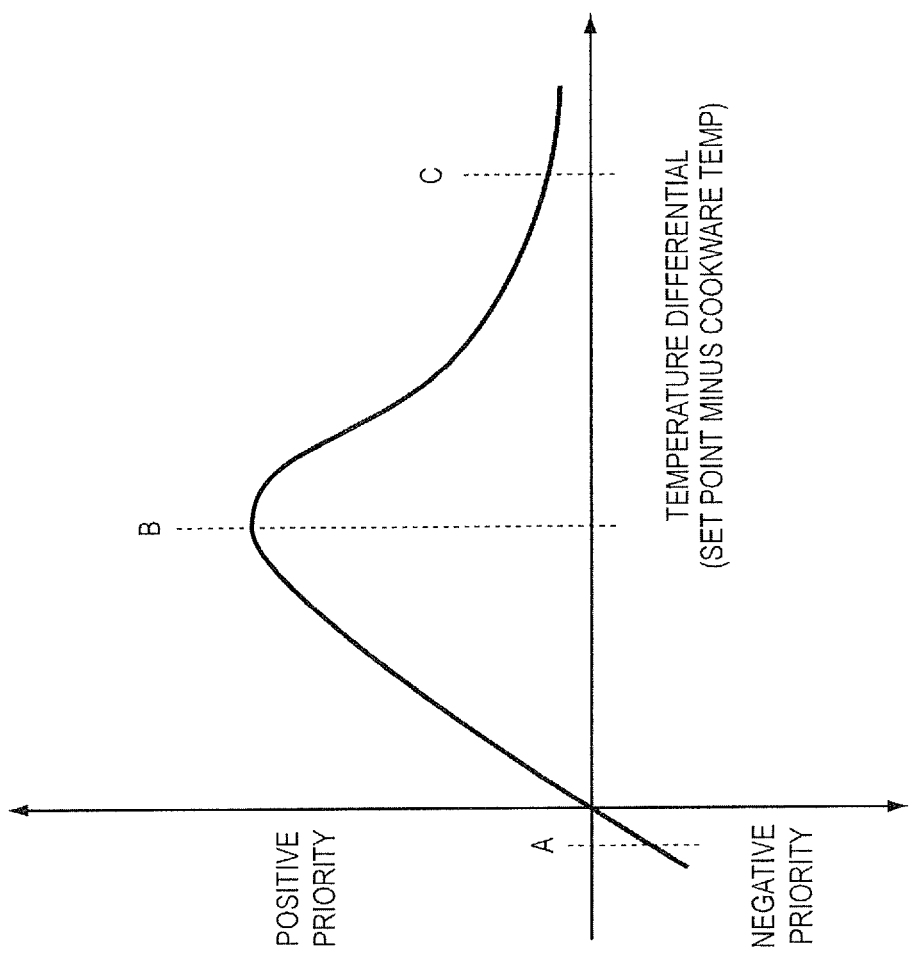
FIG. 6 is an example of prioritization during power sharing based on the temperature differential.
Figure 7:
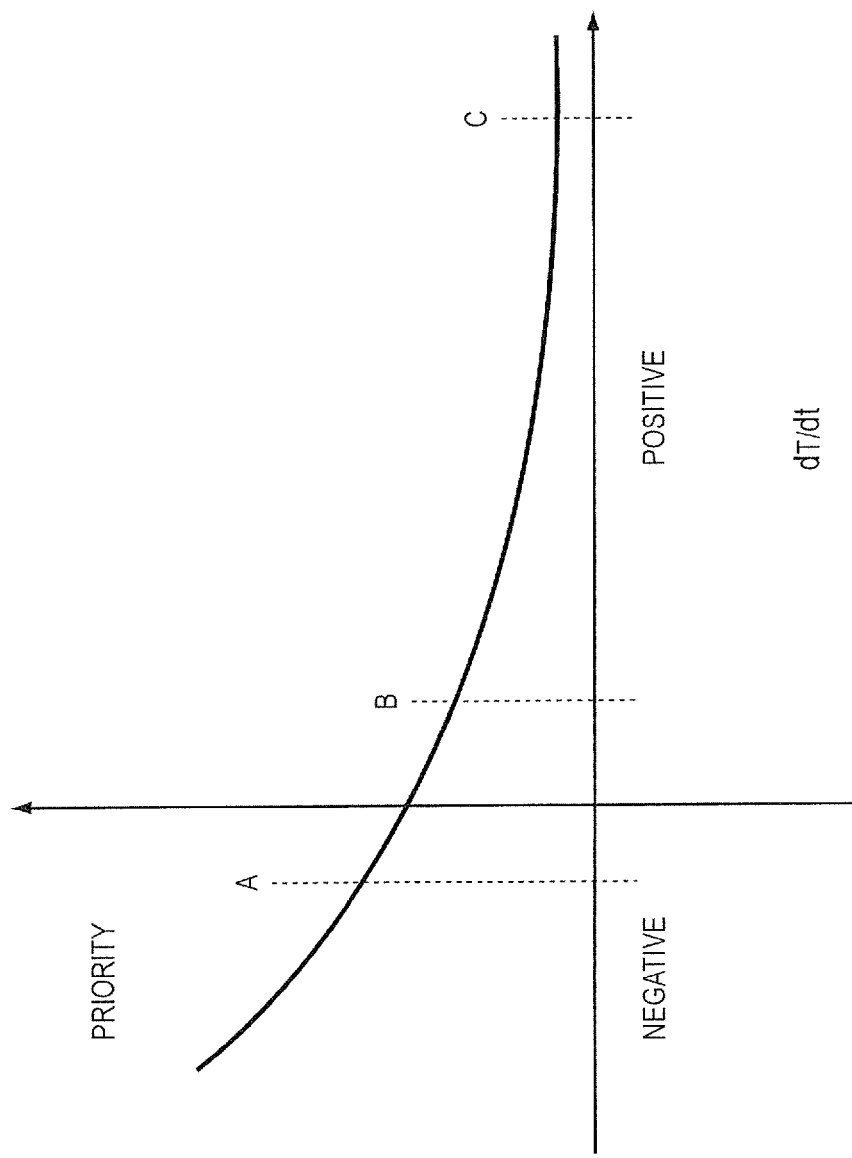
FIG. 7 is an example of prioritization during power sharing based on the rate of temperature change.

It is also possible to apply various discrete or continuous functions to preferential treatment when cooking operations are similar. The graphs of FIGS. 6 and 7 illustrate non-limiting exemplary continuous functions. FIG. 6 is an example of prioritization during power sharing based on the temperature differential. FIG. 7 is an example of prioritization during power sharing based on the rate of temperature change. FIGS. 6 and 7 illustrate operations where water is not being boiled or sweated (i.e., the foods are relatively dry). As one non-limiting example of how these two graphs can be used, the relative power sharing between two burners could be based on the relative priorities taken from the curves (e.g., the relative height difference between points B and C in FIG. 6).

FIGS. 6 and 7 illustrate the following properties, which can be used as power sharing conditions or rules herein.
Cookware that is hotter than its set point has a negative preference (e.g., point "A", FIG. 6).
Cookware that is slightly cooler than the set point will be given preference, to maintain its temperature set point (e.g., point "B", FIG. 6).
Cookware with a large temperature differential (set point minus measured temperature) will likely take a while to reach temperature so it can be de-prioritized (e.g., point "C", FIG. 6).
Cookware in which the temperature is below the setpoint and is decreasing (e.g., point "A", FIG. 7) is given more priority than an item in which the temperature is increasing (e.g., point "B", FIG. 7).
Cookware with a significantly positive increasing temperature (e.g., increasing at a rate that is expected for a dry pan being heated at full power) should reach its set point quickly so it can be de-prioritized (e.g., point "C", FIG. 7); it is already on track heating up and should continue even if some power is taken from it.

It is also possible to make power prioritization decisions based in the first instance on the temperature set point. One way to do so is to automatically alter power to a burner (i.e., prioritize it properly when power needs to be shared) based on where the set point lies in the overall range of set point temperatures. This can be approached by effectively dividing the set point temperature span into a number of portions from coolest to hottest, such as a first lowest "cool" portion (e.g., set points below about 150 C), a second "boiling" portion (e.g., set points from about 95 C to about 150 C along with relatively steady actual temperature that is indicative of boiling), a third "intermediate" portion (between about 150 C and about 220 C and where the actual temperature is not steady (i.e., it is "noisy"), which is typically indicative of operations in which vegetables are being sweated) and a fourth, highest "hot" portion (between about 150 C and about 220 C and where the actual temperature is relatively steady so sweating is not being conducted). Some typical characteristics of these four portions are as follows. Cool: During heat up the cookware temperature changes relatively rapidly and reacts to small power inputs, while temperature differential from set point is less critical. Boiling: During heat up the temperature change is close to zero, and a simmer or boil operation is very sensitive to power changes. Intermediate portion: measured temperature is not steady (i.e., it is "noisy"), larger amounts of power can be needed to change the temperature, changes in power are very variable and significant (e.g., at one moment the cookware contents can be relatively dry and require relatively low power to maintain temperature, at the next moment water may be released by the vegetables which drops the temperature and so calls for substantially more power, and when this water boils off the temperature is reached quickly and so power demand is greatly decreased again) and temperature differential is important but less so than during "hot" operations. Hot: temperature changes are relatively steady (as compared to sweating), during heat up temperature changes rapidly, temperature changes are relatively great for small amounts of power, and any temperature differential can be important to the cooking operation.

Tables 1-7 below symbolically illustrate non-limiting examples of the prioritization of power between two burners during power sharing based on the portion of the temperature range of the set point (cool (C), boiling (B), intermediate (I) and hot (H)) and the rate of change of measured temperature (i.e., dT/dt) (indicated as +, 0 or [0], where the symbol "[0]" means that in addition to the temperature not changing the temperature differential (set point minus measured temperature) is also equal, indicating cookware that is at the temperature set point). The portions of the temperature range (C, B, I, H) for one burner and the rate of change of measured temperature are indicated along the left side of the table and the same portions of the temperature range and the rate of change of measured temperature for the second burner are indicated across the top of the table. An arrow in the table points to the burner that is prioritized during power sharing, an equal sign stands for no preference (i.e., equal reduction to both burners when power is shared). "L" means that a special boil condition of the type described above is applied. These tables could be used to establish priority. The weighting of power sharing between the two burners is a related issue. As one example of weighting of power sharing, the tables could be used to provide additional inputs to the continuous preference or priority functions shown in FIGS. 6 and 7.

The following list indicates the rate of temperature change of the cookware associated with the two burners: Table 1: left side +, top side +; Table 2: left side 0, top side 0; Table 3: left side −, top side −; Table 4: left side +, top side 0; Table 5: left side 0, top side −; Table 6: left side +, top side −; Table 7: left side [0], top side [0].

TABLE 1

|   |   | + | | | |
|---|---|---|---|---|---|
|   |   | C | B | I | H |
| + | C | = | ←L | ↑ | ↑ |
|   | B | ←L | = | ↑L | ↑L |
|   | I | ↑ | ↑L | = | ↑ |
|   | H | ↑ | ↑L | ↑ | = |

TABLE 2

|   |   | 0 | | | |
|---|---|---|---|---|---|
|   |   | C | B | I | H |
| 0 | C | = | ←L | ↑ | ↑ |
|   | B | ←L | = | ↑L | ↑L |
|   | I | ↑ | ↑L | = | ↑ |
|   | H | ↑ | ↑L | ↑ | = |

TABLE 3

|   |   | − | | | |
|---|---|---|---|---|---|
|   |   | C | B | I | H |
| − | C | = | ←L | ↑ | ↑ |
|   | B | ←L | = | ↑L | ↑L |
|   | I | ↑ | ↑L | = | ↑ |
|   | H | ↑ | ↑L | ↑ | = |

TABLE 4

|   |   | 0 | | | |
|---|---|---|---|---|---|
|   |   | C | B | I | H |
| + | C | ↑ | ←L | ↑ | ↑ |
|   | B | ↑L | = | ↑L | ↑L |
|   | I | ↑ | ←L | ↑ | ↑ |
|   | H | ↑ | ←L | ↑ | ↑ |

TABLE 5

|   |   | − | | | |
|---|---|---|---|---|---|
|   |   | C | B | I | H |
| 0 | C | ↑ | ←L | ↑ | ↑ |
|   | B | ↑L | = | ↑L | ↑L |
|   | I | = | ←L | ↑ | ↑ |
|   | H | ← | ←L | ← | ↑ |

TABLE 6

|   |   | − | | | |
|---|---|---|---|---|---|
|   |   | C | B | I | H |
| + | C | ↑ | ↑ | ↑ | ↑ |
|   | B | ↑L | ↑L | ↑L | ↑L |
|   | I | ↑ | ↑ | ↑ | ↑ |
|   | H | ↑ | ↑L | ↑ | ↑ |

TABLE 7

|   |   | [0] | | | |
|---|---|---|---|---|---|
|   |   | C | B | I | H |
| [0] | C | ↑ | ←L | ↑ | ↑ |
|   | B | ↑L | ↑L | ↑L | ↑L |
|   | I | ↑ | ←L | ↑ | ↑ |
|   | H | ↑ | ←L | ↑ | ↑ |

The disclosure herein relates to methods of cooking other than induction cooking. The disclosure involves control of the power provided to the cookware, regardless of the particular energy source or the manner in which the energy is delivered to the cookware. For example, electrical energy is used to heat cookware in both induction and resistance-based cooktops; the control scheme herein can be used with either type of electric cooktop. Also, gas is used to deliver the cooking energy in gas cooktops, and the gas flow rather than output power can be the controlled variable in the control scheme herein as a means to control the power delivered to the cookware. The disclosure herein controls the provision of power to the cookware.

A number of embodiments and options have been described herein. Modifications may be made without departing from the spirit and scope of the invention. Accordingly, other embodiments are within the claims.

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other embodiments are within the scope of the following claims.

What is claimed is:

1. A cooktop power control system for a cooktop that has a plurality of burners, where the cooktop power control system controls the power delivered from two or more separate active burners to separate cookware items each of which is associated with an active burner, wherein there is a maximum limit of total power that is available for delivery from all of the burners together, where there is a heating control user interface associated with each of the burners, each heating control user interface constructed and arranged to be set by a user to a particular heating control user interface setting, where a desired cookware temperature is derived from the setting of each heating control user interface, and where measured temperatures of the cookware items are available to the cooktop power control system, the cooktop power control system comprising:

a controller that, when a plurality of burners are in sum calling for more than the maximum limit of total available power, automatically alters the power delivered from at least one of the active burners in comparison to the power called for by such burner, the alteration based on both the measured cookware temperatures of the cookware items that are associated with the active burners and the desired cookware temperatures derived from the heating control user interfaces that are associated with the active burners, wherein the controller automatically alters the power further based at least in part on a rate of change of the measured cookware temperature of one or more of the cookware items.

2. The cooktop power control system of claim 1 wherein the power delivered from a first active burner is automatically decreased by a first amount and the power delivered from a second active burner is automatically decreased by a different, second amount.

3. The cooktop power control system of claim 1 wherein the controller maintains at least a minimum amount of power delivered from each of the active burners that are requesting more than this minimum amount of power.

4. The cooktop power control system of claim 3 wherein the minimum amount of power varies depending on whether or not the measured temperature of the cookware associated with an active burner is in a boiling range.

5. The cooktop power control system of claim 1 where the desired cookware temperature spans a temperature range, and wherein the controller automatically alters the power further based on where the desired cookware temperature is in the temperature range.

6. The cooktop power control system of claim 1 wherein the controller prioritizes the active burners into higher and lower priority active burners, and causes a greater percentage of the amount of power called for by a higher priority active burner to be delivered than the percentage of the amount of power called for by a lower priority active burner.

7. The cooktop power control system of claim 6 wherein the controller prioritizes an active burner as a lower priority burner if the heating control user interface for that burner has recently been turned on and the measured cookware temperature is low such that it has not reached its set point temperature.

8. The cooktop power control system of claim 6 wherein the controller prioritizes an active burner as a higher priority burner when the desired cookware temperature of the cookware associated with such burner is higher than the desired cookware temperature of the cookware associated with another burner.

9. The cooktop power control system of claim 6 wherein the controller prioritizes an active burner as a higher priority burner when the time at full burner power for the cookware associated with such burner to reach the desired cookware temperature is less than the time at full burner power for the cookware associated with another burner to reach the desired cookware temperature.

10. The cooktop power control system of claim 9 wherein the prioritization of the active burner as a higher priority burner is further based on a comparison of the time at full burner power to reach the desired cookware temperature of a burner with a predetermined maximum time to reach the desired cookware temperature.

11. The cooktop power control system of claim 6 wherein the controller prioritizes an active burner as a lower priority burner when the measured cookware temperature of the cookware associated with such burner is greater than the desired cookware temperature.

12. The cooktop power control system of claim 6 wherein when there are at least three active burners the controller prioritizes an active burner as a higher priority burner when the difference between the desired cookware temperature and the measured cookware temperature of the cookware associated with such burner is the least of the differences between the desired cookware temperature and the measured cookware temperature of the cookware associated with each of the other active burners.

13. The cooktop power control system of claim 1 wherein when the measured temperature of the cookware associated with an active burner is in a boiling range, any automatic decrease in power delivered from the burner associated with that cookware is accomplished relatively slowly following a generally asymptotic curve.

14. A cooktop power control system for a cooktop that has a plurality of burners, where the cooktop power control system controls the power delivered from two or more separate active burners to separate cookware items each of which is associated with an active burner, wherein there is a maximum limit of total power that is available for delivery from all of the burners together, where there is a heating control user interface associated with each of the burners, each heating control user interface constructed and arranged to be set by a user to a particular heating control user interface setting, where a desired cookware temperature is derived from the setting of each heating control user interface, and where measured temperatures of the cookware items are available to the cooktop power control system, the cooktop power control system comprising:

a controller that, when a plurality of burners are in sum calling for more than the maximum limit of total available power, automatically alters the power delivered from at least one of the active burners in comparison to the power called for by such burner, the alteration based on both the measured cookware temperatures of the cookware items that are associated with the active burners and the desired cookware temperatures derived from the heating control user interfaces that are associated with the active burners, where the desired cookware temperature spans a temperature range, and wherein the controller automatically alters the power further based on where the desired cookware temperature is in the temperature range, wherein the temperature range is divided into a plurality of portions, including, from coolest to hottest, a cool portion, a boiling portion, an intermediate portion and a hot portion, and wherein the controller automatically alters the power further based on which portion of the temperature range the desired cookware temperature is in, and a rate of change of the measured cookware temperature.

15. A cooktop power control system for a cooktop that has a plurality of burners, where the cooktop power control system controls the power delivered from two or more separate active burners to separate cookware items each of which is associated with an active burner, wherein there is a maximum limit of total power that is available for delivery from all of the burners together, where there is a heating control user interface associated with each of the burners, each heating control user interface constructed and arranged to be set by a user to a particular heating control user interface setting, where a desired cookware temperature is derived from the setting of each heating control user interface, and where measured temperatures of the cookware items are available to the cooktop power control system, the cooktop power control system comprising:

a controller that, when a plurality of burners are in sum calling for more than the maximum limit of total available power, automatically alters the power delivered from at least one of the active burners in comparison to the power called for by such burner, the alteration based on both the measured cookware temperatures of the cookware items that are associated with the active burners and the desired cookware temperatures derived from the heating control user interfaces that are associated with the active burners wherein the controller prioritizes the active burners into higher and lower priority active burners, and causes a greater percentage of the amount of power called for by a higher priority active burner to be delivered than the percentage of the amount of power called for by a lower priority active burner;

wherein the controller prioritizes an active burner as a higher priority burner if the measured temperature of the cookware associated with such burner is decreasing in comparison to the desired cookware temperature.

16. A cooktop power control system for a cooktop that has a plurality of burners, where the cooktop power control system controls the power delivered from two or more separate active burners to separate cookware items each of which is associated with an active burner, wherein there is a maximum limit of total power that is available for delivery from all of the burners together, where there is a heating control user interface associated with each of the burners, each heating control user interface constructed and arranged to be set by user to a particular heating control user interface setting, where a desired cookware temperature is derived from the setting of each heating control user interface, and where measured temperatures of the cookware items are available to the cooktop power control system, the cooktop power control system comprising:

a controller that, when a plurality of burners are in sum calling for more than the maximum limit of total available power, automatically alters the power delivered from at least one of the active burners in comparison to the power called for by such burner, the alteration based on both the measured cookware temperatures of the cookware items that are associated with the active burners and the desired cookware temperatures derived from the heating control user interfaces that are associated with the active burners wherein the controller prioritizes the active burners into higher and lower priority active burners, and causes a greater percentage of the amount of power called for by a higher priority active burner to be delivered than the percentage of the amount of power called for by a lower priority active burner, wherein the controller prioritizes an active burner as a lower priority burner when the difference between the desired cookware temperature and the measured cookware temperature of the cookware associated with such burner is greater than a predetermined percentage of a temperature set point determined by the heating control user interface, and the measured cookware temperature is changing slowly such that the rate of change of the measured cookware temperature is less than it would be for a dry pan being heated at full power.

17. A cooktop power control system for a cooktop that has a plurality of burners, where the cooktop power control system controls the power delivered from two or more separate active burners to separate cookware items each of which is associated with an active burner, wherein there is a maximum limit of total power that is available for delivery from all of the burners together, where there is a heating control user interface associated with each of the burners, each heating control user interface constructed and arranged to be set by a user to a particular heating control user interface setting, where a desired cookware temperature is derived from the setting of each heating control user interface, and where measured temperatures of the cookware items are available to the cooktop power control system, the cooktop power control system comprising:

a controller that, when a plurality of burners are in sum calling for more than the maximum limit of total available power, automatically alters the power delivered from at least one of the active burners in comparison to the power called for by such burner, the alteration based on both the measured cookware temperatures of the cookware items that are associated with the active burners and the desired cookware temperatures derived from the heating control user interfaces that are associated with the active burners, wherein the controller prioritizes the active burners into higher and lower priority active burners, and causes a greater percentage of the amount of power called for by a higher priority active burner to be delivered than the percentage of the amount of power called for by a lower priority active burner, wherein the controller prioritizes an active burner as a lower priority burner when the measured cookware temperature of the cookware associated with such burner is increasing at a rate approximately equal to the rate that is expected for a dry pan being heated at full power.

18. A cooktop power control system for a cooktop that has a plurality of burners, where the cooktop power control system controls the power delivered from two or more separate active burners to separate cookware items each of which is associated with an active burner, wherein there is a maximum limit of total power that is available for delivery from all of the burners together, where there is a heating control user interface associated with each of the burners, each heating control user interface constructed and arranged to be set by a user to a particular heating control user interface setting, where a desired cookware temperature is derived from the setting of each heating control user interface, and where measured temperatures of the cookware items are available to the cooktop power control system, the cooktop power control system comprising:

a controller that, when a plurality of burners are in sum calling for more than the maximum limit of total available power, automatically reduces the power delivered from at least one of the active burners in comparison to the power called for by such burner, the reduction based on both the measured cookware temperatures of the cookware items that are associated with the active burners and the desired cookware temperatures derived from the heating control user interfaces that are associated with the active burners;

wherein the controller automatically alters the power further based at least in part on a rate of change of the measured cookware temperature of one or more of the cookware items, and wherein when an active burner is in the boiling range the controller reduces the power to such burner gradually.

19. A cooktop power control system for a cooktop that has a plurality of burners, where the cooktop power control system controls the power delivered from two or more separate active burners to separate cookware items each of which is associated with an active burner, wherein there is a maximum limit of total power that is available for delivery from all of the burners together, where there is a heating control user interface associated with each of the burners, each heating control user interface constructed and arranged to be set by a user to a particular heating control user interface setting, where a desired cookware temperature is derived from the setting of each heating control user interface, and where measured temperatures of the cookware items are available to the cooktop power control system, the cooktop power control system comprising:

a controller that, when a plurality of burners are in sum calling for more than the maximum limit of total available power, automatically reduces the power delivered from at least one of the active burners in comparison to the power called for by such burner, the reduction based on: (i) the measured cookware temperatures of the cookware items that are associated with the active burners, (ii) the desired cookware temperatures derived from the heating control user interfaces that are associated with the active burners, and (iii) a rate of change of the measured cookware temperature of one or more of the cookware items; and wherein the reduction is such that the controller maintains at least a minimum amount of power delivered from each of the active burners that are requesting more than this minimum amount of power.

* * * * *